US007907931B2

(12) United States Patent
Hartigan et al.

(10) Patent No.: US 7,907,931 B2
(45) Date of Patent: Mar. 15, 2011

(54) PORTABLE COMMUNICATIONS DEVICE

(75) Inventors: Patrick Francis Hartigan, Doolin (IE); Michael Joseph O'Connor, Glencar (IE); George Michael Brosnan, Tralee (IE); Jaroslaw Irenesz Swiechowicz, Tralee (IE)

(73) Assignee: Securecom Technologies Limited, Tralee (IE)

( * ) Notice: Subject to any disclaimer, the term of this patent is extended or adjusted under 35 U.S.C. 154(b) by 1077 days.

(21) Appl. No.: 10/558,295

(22) PCT Filed: May 26, 2004

(86) PCT No.: PCT/IE2004/000077

§ 371 (c)(1), (2), (4) Date: Aug. 31, 2006

(87) PCT Pub. No.: WO2004/104962

PCT Pub. Date: Dec. 2, 2004

(65) Prior Publication Data

US 2007/0082652 A1 Apr. 12, 2007

(30) Foreign Application Priority Data

May 26, 2003 (IE) .................................. S2003/0397

(51) Int. Cl.
*H04M 11/04* (2006.01)
*H04M 1/00* (2006.01)
*G01S 19/00* (2010.01)

(52) U.S. Cl. .................... 455/404.2; 455/567; 342/357.2

(58) Field of Classification Search ............. 342/357.07; 340/539.1, 572.1, 457, 539; 455/567, 456
See application file for complete search history.

(56) References Cited

U.S. PATENT DOCUMENTS

| | | | | |
|---|---|---|---|---|
| 5,949,350 | A * | 9/1999 | Girard et al. | 340/825.49 |
| 6,362,778 | B2 * | 3/2002 | Neher | 342/357.07 |
| 7,498,937 | B2 * | 3/2009 | Martin et al. | 340/539.1 |
| 2001/0052849 | A1 * | 12/2001 | Jones, Jr. | 340/572.1 |
| 2002/0137552 | A1 * | 9/2002 | Cannon et al. | 455/567 |

* cited by examiner

*Primary Examiner* — Charles N Appiah
*Assistant Examiner* — Kiet Doan
(74) *Attorney, Agent, or Firm* — Sughrue Mion, PLLC

(57) ABSTRACT

A portable communications device (1) for wearing by a person and for use in conjunction with a Bluetooth enabled mobile phone (3) for communicating a signal indicative of the existence of an emergency to a base station comprises a pendant shaped housing (5) within which is located a first interface circuit (12) which comprises a pair of activating switches (14) operable by panic buttons (15) for facilitating inputting a signal to the device (1) indicative of the existence of an emergency. A microprocessor (18) reads signals from the first interface circuit (12) and reads the last determined position of the device from a GPS positioning circuit (8) in the housing (5), and also reads the identity of the device (1), a phone number of the base station to which a message indicative of the emergency is to be communicated and a message indicative of the emergency from a programmable memory (10). The microprocessor (18) prepares an activating signal which comprises the identity and position of the device (1), the phone number of the base station and the message, which is transmitted with a time label through a Bluetooth transmitter/receiver (20) to the mobile phone (3). The activating signal activates the mobile phone (3) to relay the data contained in the activating signal to the base station.

20 Claims, 5 Drawing Sheets

PORTABLE COMMUNICATIONS DEVICE

Figure 1:
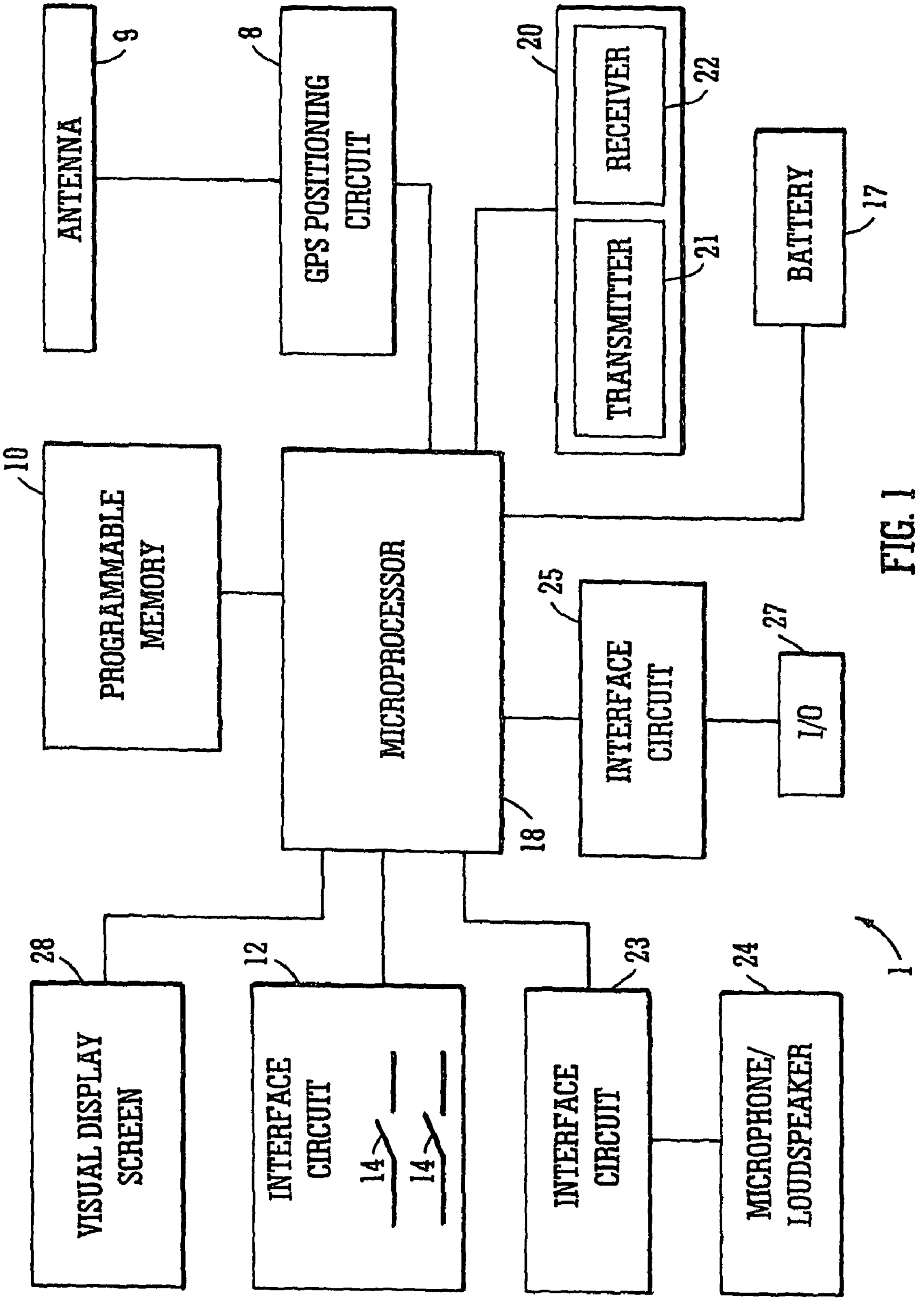

The present invention relates to a portable communications device, and in particular, to a portable wireless communications device for location-based telemetry, and personal security applications.

Portable communications devices for allowing an individual to summon help in the event of an emergency are well known. Typically, such devices are provided to be worn by a person, and may comprise, for example, a pendant device which can be worn around the neck of the individual. In the event of an emergency, an individual by pressing a button of a button operated switch activates the device for outputting an alarm. The alarm may be an audible alarm, a visual alarm, and in more sophisticated communications devices, the communications device may be adapted for transmitting an alerting signal by means of a radio transmission. More recently the combination of a radio transmitter and a co-located GPS satellite receiver has enabled the precise location of an individual to be determined and to be transmitted by means of a radio signal. However, the functionality of such devices is limited. Furthermore, by virtue of the fact that such devices must communicate over relatively large distances, up to 15 km and greater, it is necessary that a radio frequency transmitter capable of transmitting over such large distances is provided in the device. Additionally, where bidirectional communication is required between the portable communications device and, for example, a base station, a radio frequency receiver is also required, which also must have a capability of receiving transmitted radio signals over a similar distance. Such radio frequency transmitters and receivers tend to be relatively complex and also relatively expensive. Furthermore, such radio frequency transmitters and receivers have a relatively large energy demand, and thus, must be powered by an appropriately sized battery. Thus, such portable communication devices tend to be relatively bulky, and due to the battery requirements tend to be relatively heavy, and are thus, in general, unsuitable for wearing by a person.

There is therefore a need for a portable communications device which overcomes the problems of known prior art devices.

The present invention is directed towards providing such a portable communications device.

According to the invention there is provided a portable communications device for wearing on a person for communicating a signal indicative of the location of the person to a predetermined location, wherein the communications device is operable in conjunction with a wireless enabled telecommunications terminal equipment device for communicating the signal indicative of the location of the person to the predetermined location, and the portable communications device comprises a position determining circuit for communicating with an external electronic positioning system for determining the location of the device, an input interface for receiving an input signal, a wireless transmitter for transmitting a signal from the device to the wireless enabled telecommunications terminal equipment device via a wireless communications link, a microprocessor responsive to an input signal entered through the input interface, for reading a signal indicative of the location of the device from the position determining circuit, and for operating the wireless transmitter for transmitting an activating signal to the wireless enabled telecommunications terminal equipment device, the activating signal comprising a signal indicative of the identity of the device and the signal indicative of the location of the device, the activating signal being provided for activating the wireless enabled telecommunications terminal equipment device for communicating the signals indicative of the identity and location of the device to the predetermined location via a telecommunications network.

Preferably, the input interface comprises an activating switch for facilitating inputting of an input signal, and the microprocessor is responsive to the input signal. Advantageously, the activating switch is a bi-state activating switch, and is operable from one of the states to the other for facilitating the inputting of the input signal. Ideally, the bi-state activating switch is stable in one state, and the input signal is inputted through the activating switch by operating the switch from the stable state to the other state, and preferably, the activating switch is a button operated activating switch.

In another embodiment of the invention the input interface comprises a voice signal interface circuit for receiving a voice input signal, the microprocessor being responsive to the voice input signal. Preferably, the voice signal interface circuit comprises a microphone. Advantageously, the voice signal interface circuit comprises a loudspeaker for facilitating bidirectional voice communication with the portable communications device.

In a further embodiment of the invention a storing means is provided for storing the identity of the device, and the microprocessor is responsive to the input signal for reading the identity of the device from the storing means.

Preferably, the storing means is adapted for storing at least one message for transmission in the activating signal through the wireless transmitter under the control of the microprocessor.

Advantageously, the storing means is adapted for storing a plurality of selectable messages, and the microprocessor is responsive to the input signal for selecting at least one of the stored messages for transmission in the activating signal through the wireless transmitter under the control of the microprocessor.

In one embodiment of the invention one of the selectable messages stored in the storing means is an alerting message indicative of an emergency status event.

In another embodiment of the invention one of the messages stored in the storing means is a message indicative of the nature of the emergency.

In a further embodiment of the invention the storing means is programmable for permitting storing of the messages.

Preferably, an input means is provided for inputting data and messages to the storing means.

In one embodiment of the invention the storing means is adapted for storing data indicative of the destination of the predetermined location, and preferably, the storing means is adapted for storing data indicative of a plurality of predetermined locations.

In one embodiment of the invention the data indicative of at least one of the predetermined locations which is stored in the storing means is a telephone number of the location.

In another embodiment of the invention the data indicative of at least one of the predetermined locations which is stored in the storing means is a Uniform Resource Locator of the location.

In a further embodiment of the invention the data indicative of at least one of the predetermined locations which is stored in the storing means is an IP address of the location.

In one embodiment of the invention the wireless transmitter is adapted for facilitating voice communication between the portable communications device and the wireless enabled telecommunications terminal equipment device.

In another embodiment of the invention the input interface comprises a wireless receiver for receiving a signal from the wireless enabled telecommunications terminal equipment device via a wireless communication link for facilitating reception of an input signal received via the telecommunications network by the wireless enabled telecommunications terminal equipment device.

In another embodiment of the invention the wireless transmitter and receiver co-operate for facilitating bidirectional communication between the portable communications device and the wireless enabled telecommunications terminal equipment device.

In a further embodiment of the invention the wireless receiver is adapted for facilitating voice communication between the wireless enabled telecommunications terminal equipment device and the portable communications device.

In another embodiment of the invention data and messages to be stored in the storing means are inputted through the wireless receiver, and the microprocessor is responsive to signals received through the wireless receiver for storing data and messages.

Preferably, the microprocessor is responsive to an interrogation signal received through the wireless receiver for transmitting the signals indicative of the identity and location of the device through the wireless transmitter.

In one embodiment of the invention the wireless receiver is a radio frequency, receiver.

In another embodiment of the invention the wireless transmitter is adapted to communicate with the wireless enabled telecommunications terminal equipment device using Bluetooth standard.

In one embodiment of the invention the input interface comprises a data interface for acquiring data signals from a patient monitoring device worn by the person, and the microprocessor is responsive to data signals acquired through the data interface.

Preferably, the microprocessor time labels at least some of the transmissions through the wireless transmitter with the current time of the transmission. Advantageously, the microprocessor time labels each of the transmissions through the wireless transmitter with the current time of the transmission.

In another embodiment of the invention a visual display means is provided on the portable communications device for displaying data. Preferably, at least some of the messages to be transmitted are displayed on the visual display means. Advantageously, each message to be transmitted is displayed on the visual display means.

In one embodiment of the invention the microprocessor is responsive to a message received through the wireless receiver for displaying the message on the visual display means. Preferably, the microprocessor is responsive to an input signal received through the input interface for displaying data inputted through the input interface.

In one embodiment of the invention the visual display means comprises a visual display screen.

In another embodiment of the invention the microprocessor controls the telecommunications terminal equipment device for displaying data on a visual display means of the telecommunications terminal equipment device.

In another embodiment of the invention the wireless transmitter is a radio frequency transmitter.

In a further embodiment of the invention the wireless receiver is adapted to communicate with the wireless enabled telecommunications terminal equipment device using Bluetooth standard.

In one embodiment of the invention the position determining circuit for communicating with an external electronic positioning system is adapted for communicating with a satellite positioning system for determining the position of the device.

In another embodiment of the invention the position determining circuit for communicating with an external electronic positioning system is adapted for communicating with a terrestrial positioning system for determining the position of the device.

In a further embodiment of the invention the position determining circuit is adapted for determining the position of the portable communications device from. a satellite GPS system with or without supplemental transmissions from a terrestrial positioning system.

In one embodiment of the invention the microprocessor is initially responsive to the input signal for operating the wireless transmitter for transmitting a preliminary activating signal to the wireless enabled telecommunications terminal equipment device, the preliminary activating signal comprising a signal indicative of the identity of the device, the activating signal being provided for activating the wireless enabled telecommunications terminal equipment device for communicating the signal indicative of the identity of the device to the predetermined location via the telecommunications network. Preferably, the preliminary activating signal comprises the emergency message.

In another embodiment of the invention the microprocessor is responsive to the input signal for operating the wireless transmitter for outputting a homing signal containing the identity of the device for facilitating location of the device. Preferably, the strength of the homing signal transmitted by the wireless transmitter is stronger than the strength of the activating signal transmitted by the wireless transmitter. Advantageously, the homing signal is transmitted under the Bluetooth standard.

In one embodiment of the invention the homing signal is transmitted for a predetermined time period, and the homing signal is transmitted at predetermined intervals.

In a still further embodiment of the invention the input interface is adapted for receiving signals from a digital, still or moving camera, optical scanner, fingerprint reader, barcode reader, smart card reader or an environment sensor, and the microprocessor is responsive to input signals received from such devices for transmitting an appropriate message through the wireless transmitter to the wireless enabled telecommunications terminal equipment device.

In one embodiment of the invention an audible alarm is provided, and the microprocessor is responsive to an input signal received through the input interface for activating the audible alarm in the event of an input signal indicating the existence of an emergency.

Preferably, the range of the wireless transmitter of the portable communications device lies in the range of 0 meters to 100 meters. Advantageously, the range of the wireless transmitter of the portable communications device is approximately 10 meters.

In one embodiment of the invention the wireless enabled telecommunications terminal equipment device with which the portable communications device is adapted to communicate is a mobile phone carried on the person.

In another embodiment of the invention the portable communications device is housed within a housing. Preferably, the housing is a pendant type housing, and the portable communications device is adapted for wearing as a pendant around the neck of a person, wrist, ankle or other convenient location on or in proximity to the person.

The invention also provides in combination a portable communications device according to the invention, and a wireless enabled telecommunications terminal equipment device, the wireless enabled telecommunications terminal equipment device being adapted for communicating with the portable communications device, and being responsive to an activating signal from the portable communications device for communicating a signal received from the portable communications device to a predetermined location via a telecommunications network.

In one embodiment of the invention the wireless enabled telecommunications terminal equipment device is a mobile phone.

The advantages of the invention are many. A particularly important advantage of the invention is that the portable communications device according to the invention can be provided as a relatively small, neat and lightweight device, which is particularly suitable for being produced as a pendant, typically of the type which can be worn around the neck of a person. This advantage of the portable communications device according to the invention is achieved by virtue of the fact that the portable communications device communicates with a wireless enabled telecommunications terminal equipment device, and therefore signals, messages and data to be transmitted by the portable communications device over relatively large distances are transmitted over the relatively large distances by the wireless enabled telecommunications terminal equipment device. Thus, the portable communications device according to the invention only requires a relatively small, inexpensive, lightweight transmitter suitable for wireless communication between the portable communications device and the wireless enabled telecommunications terminal equipment device. Since both the portable communications device can be worn or carried on the person; and the wireless enabled telecommunications terminal equipment device can be a mobile phone, and thus carried by the person, the distance over which the wireless communication is carried out is relatively short, and typically, would not be greater than a few meters, and in general, the wireless communication distance would be less than one meter, and more typically of the order of a half a meter. This, thus, permits the transmitter of the portable communications device to be relatively inexpensive, small and non-complex.

Additionally, the energy requirement of such a transmitter is relatively low, thus permitting the portable communications device according to the invention to be powered by a relatively low capacity lightweight battery, thereby permitting the portable communications device to be miniaturised, and provided as a lightweight device. Similarly, where the portable communications device is suitable for bi-directional communication with the wireless enabled telecommunications terminal equipment device, a relatively inexpensive low power consumption radio frequency receiver can be provided, thus also minimising the energy requirement, size and weight of the portable communications device. Since nowadays the majority of people, including children, carry mobile phones, the portable communications device according to the invention permits a person to be readily easily equipped with a location based telemetry device for personal security applications.

A further advantage of the invention is provided when the input interface is provided by an activating switch, and in particular, by a button operated activating switch, since all that is required of an individual in the event of encountering an emergency is to activate the switch by the activating button. Once the switch has been activated, the microprocessor transmits the activating signal which comprises the identity and location of the device to the wireless enabled telecommunications terminal equipment device, and where the wireless enabled telecommunications terminal equipment device is provided by a mobile phone, either the mobile phone or the portable communications device may include the telephone number of the predetermined location to which the identity and location of the device is to be communicated. This, thus, permits virtually instant communication of an alerting signal to a remotely located base station alerting to the existence and location of the emergency.

Initially, it is envisaged that the portable communications device need only output, a signal indicative of the identity of the device and an alerting message indicative of an emergency status event. Such a signal is of intrinsic value, as it will indicate the occurrence of an emergency and the identity of the device corresponding to the person experiencing the emergency. Although, once the initial message containing the identity of the device and the alerting message indicative of an emergency status event being transmitted, the portable communications device would then transmit its identity and location in a separate message to the base station. The advantage of initially transmitting the identity of the device and a message indicative of an emergency status event before transmitting the location of the device is that it would avoid delays in obtaining the location of the device, and would give the base station or other telephone number to whom the message is to be sent prior warning of the existence of an emergency existing, as well as the identity of the device with which the emergency is associated. This would allow the base station to prepare appropriate emergency services and in many cases dispatch the emergency services prior to the actual location of the device being received, since in many cases, the base station would have a rough idea of the location of the device.

In its simplest, the portable communications device need only output its identity and location, since the base station would know that the identity and location of the portable communications device would not be transmitted without an emergency existing. However, where the portable communications device is provided with a storing means for storing one or more selectable messages, a person wearing the device can select the message to be transmitted in the event of an emergency or indeed, an incident of another status arising.

The provision of the portable communications device according to the invention with a wireless receiver provides the added advantage that the portable communications device can be in bidirectional communication with the wireless enabled telecommunications terminal equipment device, and in turn with a base station. Thereby, the base station can periodically interrogate the portable communications device as to its current location, in order to monitor the movement of a person wearing the device.

Additionally, where the portable communications device is provided with a storing means, the identity of a plurality of predetermined locations to which one or more selectable stored messages are to be communicated can be stored, and thus, in the event of an emergency or an event of another status arising, the activating signal transmitted by the portable communications device to the wireless enabled telecommunications terminal equipment device can comprise the identity, for example, the one or more telephone numbers of the predetermined locations to which the message is to be communicated, and the wireless enabled telecommunications terminal equipment device on receiving the activating signal can thus communicate the message or messages to the appropriate locations via the telecommunications network.

Figure 2:
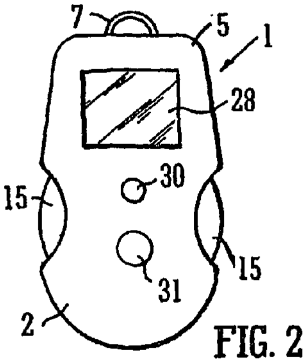
Figure 3:
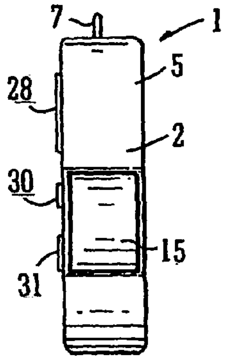
Figure 4:
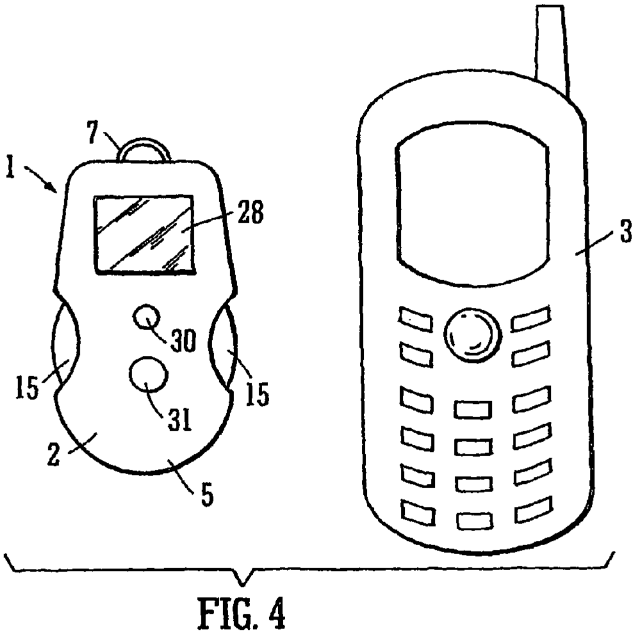
Figure 6:
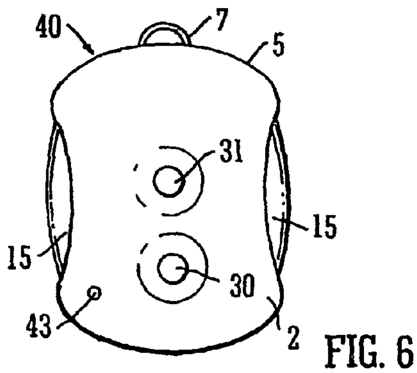
Figure 7:
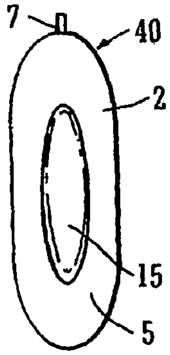
Figure 5:
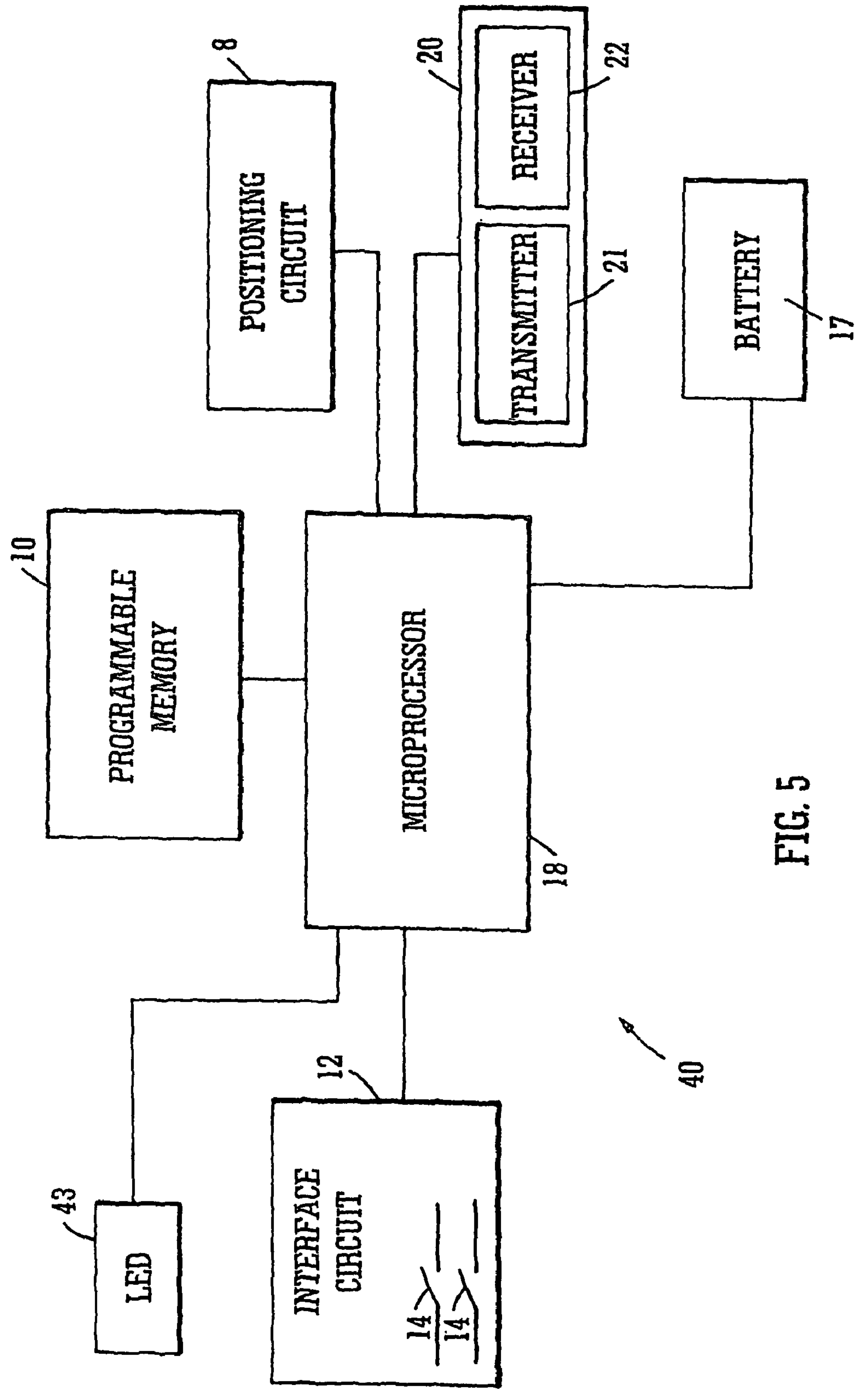
Figure 8A:
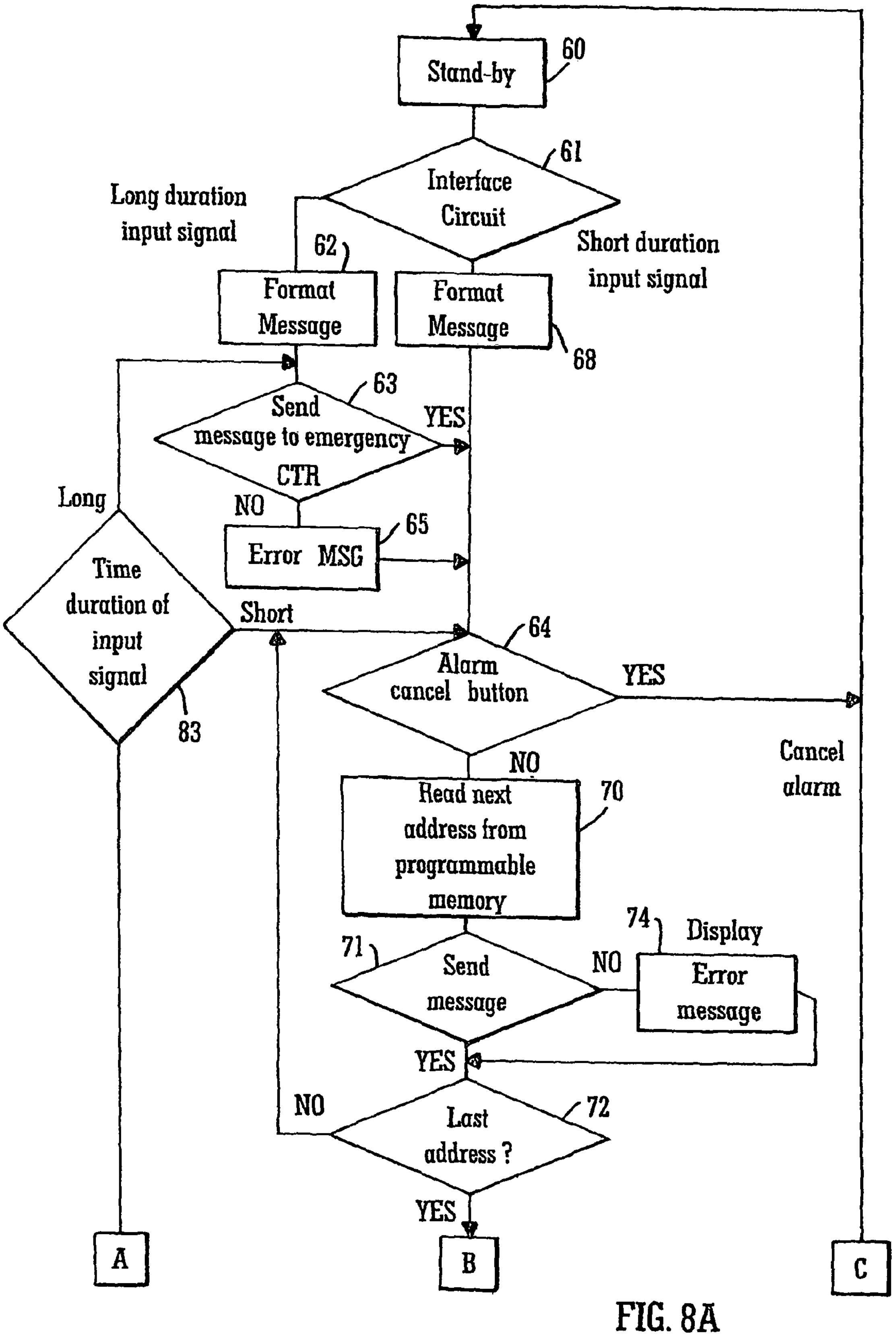
Figure 8B:
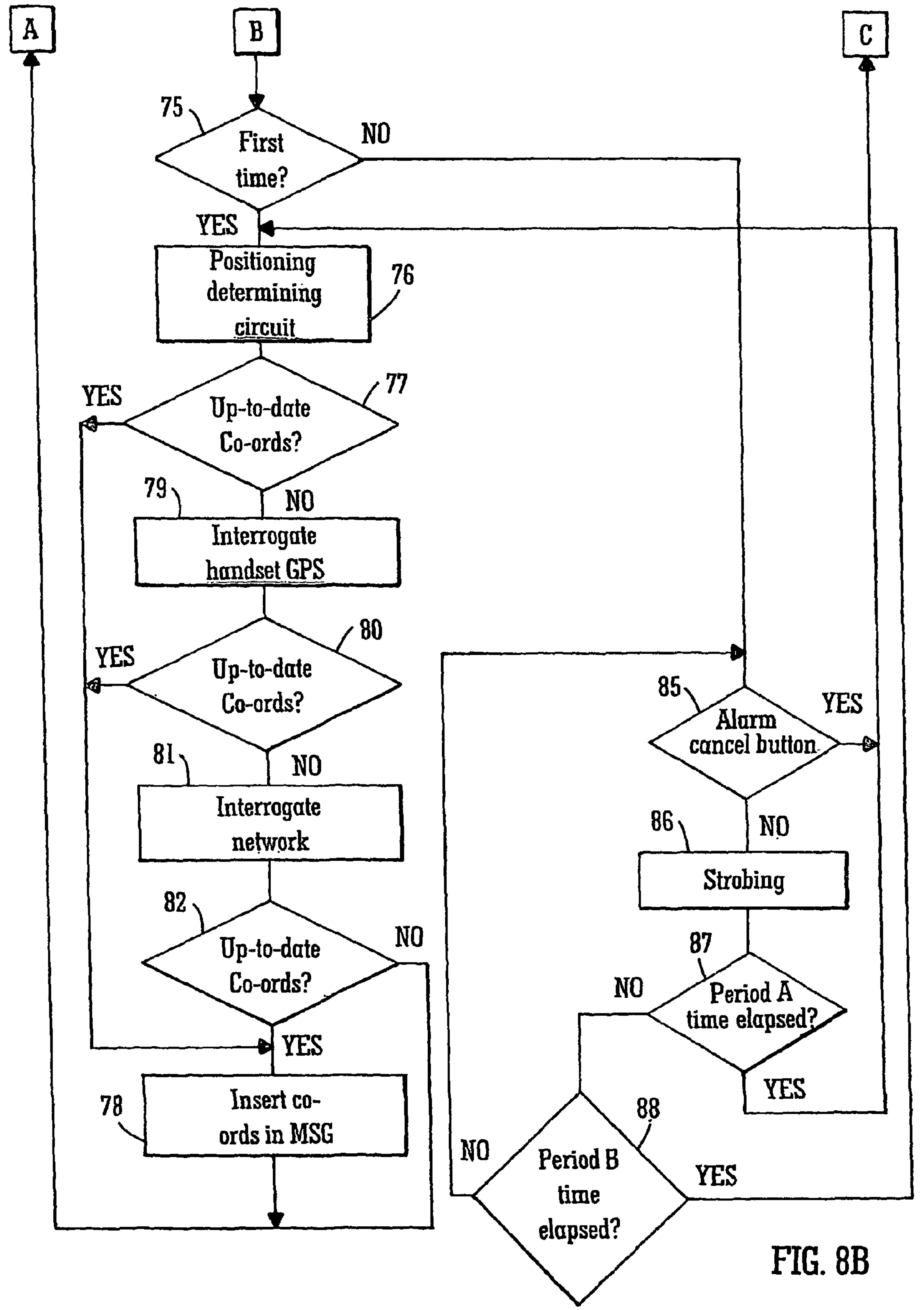

The invention will be more clearly understood from the following description of some preferred embodiments thereof, which are given by way of example only, with reference to the accompanying drawings, in which:

FIG. 1 is a block representation of a portable communications device according to the invention, FIG. 2 is a front elevational view of the portable communications device of FIG. 1, FIG. 3 is a side elevational view of the portable communications device of FIG. 1, FIG. 4 is a front elevational view of the portable communications device in use, FIG. 5 is a block representation of a portable communications device according to another embodiment of the invention, FIG. 6 is a front elevational view of the portable communications device of FIG. 5, FIG. 7 is a side elevational view of the portable communications device of FIG. 5, and FIGS. 8*a* and 8*b* illustrate a flow chart of a sub-routine of a computer programme under which the operation of the portable communications device of FIG. 5 is controlled.

Referring to the drawings and initially to FIGS. 1 to 4, there is illustrated a portable communications device according to the invention, indicated generally by the reference numeral 1, which is provided in the form of a pendant 2, which is suitable for wearing around the neck, wrist, ankle or any other convenient location on a person. The portable communications device 1 is operable in conjunction with a wireless enabled telecommunications terminal equipment device, in this embodiment of the invention a Bluetooth enabled mobile phone 3, for communicating a signal, which in this case is a message to one or more predetermined locations, one of which is a remote base station (not shown) over a telecommunications network through which the mobile phone 3 is adapted to communicate. As will be described below, the portable communications device 1 is adapted for bidirectional wireless communication with the mobile phone 3, and in this case the bidirectional wireless communication between the portable communications device 1 and the mobile phone 3 is in accordance with the Bluetooth standard. The message typically is a message indicating the existence of an emergency, and indicating that the person wearing the device requires assistance. Typically, the base station would be appropriately manned, and would arrange for appropriate assistance to be dispatched to the person. The particulars contained in the message outputted by the portable communications device 1 through the mobile phone 3 will be described below, however, as a minimum, each message includes the identity of the portable communications device 1 or the individual wearing the device, and the current or last determined location of the device 1 with a time label.

The portable communications device 1 comprises a housing 5 of plastics material and of pendant shape. An eye bracket 7 extending from the housing 5 accommodates a chain (not shown) or other ligature for facilitating wearing of the portable communications device 1 by a person.

Referring now in particular to FIG. 1, the portable communications device 1 comprises a position determining circuit, in this embodiment of the invention a GPS positioning circuit 8 which receives signals through a GPS antenna 9 from a GPS satellite navigation system for determining the location of the device 1. The GPS positioning circuit 8 also receives signals from a terrestrial positioning system for determining the location of the portable communications device 1. The GPS positioning circuit 8 periodically determines the position of the device 1 from the signals received from the GPS satellite navigation system and the terrestrial positioning system. The GPS positioning circuit 8 stores the last determined position of the portable communications device 1 until the next position has been determined.

A programmable memory 10 stores a plurality of selectable messages in digital format which may be selected for transmission to the mobile phone 3 for subsequent communication to the base station. The messages may be any desired message, but typically, would be indicative of an emergency and other events in which a person wearing the portable communications device 1 is likely to find himself or herself, so that the appropriate message can be selected. One type of message may, for example, be a message indicative of the existence of an emergency, and another type of message may be indicative of the nature of the emergency. In this embodiment of the invention the programmable memory 10 is programmable through the mobile phone 3 as will be described below.

The programmable memory 10 also stores the identity of one or more of the predetermined locations to which a message or messages are to be communicated by the mobile phone 3 via the telecommunications network. The identity of the locations, including that of the base station are stored as telephone numbers, e-mail addresses and/or Uniform Resource Locator or IP addresses. The identity of the portable communications device 1 is also stored in the programmable memory 10. The identity of the programmable communications device 1 may be a unique code suitable for identifying the portable communications device 1, or it may be the identity of the person who is wearing the device 1, and may be stored for reproduction as a text message or a voice message.

An input interface through which input signals are inputted into the portable communications device 1 comprises four interface circuits. One of the interface circuits is a first interface circuit 12 which is responsive to an input signal inputted through either one or both of a pair of activating bi-state switches 14 which are button operated by a pair of corresponding panic buttons 15 located in the housing 5. Each bi-state switch 14 is stable in an open circuit state, and on the corresponding panic button 15 being depressed into the housing 5, the corresponding activating switch 14 is operated from its stable open circuit state to an unstable closed circuit state for providing the input signal to the first interface circuit 12 from a battery 17 of the portable communications device 1.

A microprocessor 18 is responsive to an input signal from either one or both of the activating switches 14 through the first interface circuit 12 for transmitting an activating signal to the mobile phone 3 for communicating a message or messages to the base station as will be described below. The activating signal comprises the data which is to be communicated to the base station, the telephone number of the base station and a signal to initiate the setting up of a phone call by the mobile phone to base station. A time label is also attached to each activating signal. A Bluetooth transmitter/receiver 20 with a transmission and receiving range of approximately ten meters is operable under the control of the microprocessor 18 for providing bidirectional wireless communication between the device 1 and the mobile phone 3. The transmitter/receiver 20 comprises a transmitter 21, which operates to the Bluetooth standard and a receiver 22 which also operates to the Bluetooth standard.

In response to an input signal being inputted through one or both of the activating switches 14, the microprocessor reads the identity of the portable communications device 1 from the programmable memory 10, the telephone number of the base station from the programmable memory 10 and the message to be transmitted from the programmable memory 10. The microprocessor 18 also reads the current or last determined position of the portable communications device 1 from the GPS positioning circuit 8. The microprocessor 18 assembles the identity of the device 1, the telephone number of the base station, the message to be communicated to the base station and the current or last determined position of the device 1 into an activating signal, which is also time labelled, which is then under the control of the microprocessor 18 transmitted to the mobile phone 3 through the transmitter 21.

The mobile phone 3 is responsive to the activating signal received from the portable communications device 1 for transmitting the data embedded in the activating signal, namely, the identity and location of the portable communications device 1, the message and the time label to the base station. The mobile phone 3 on receipt of the activating signal dials the number of the base station to which the data is to be communicated; to establish a phone call. On the phone call being established, the data is communicated from the mobile phone 3 to the base station.

The receiver 22 of the transmitter/receiver 20 as well as facilitating bidirectional communication between the portable communications device 1 and the mobile phone 3, also acts as an input interface, in other words, a second interface for facilitating inputting of an input signal to the portable communications device 1 received through the mobile phone 3. In this embodiment of the invention one input signal which may be inputted through the receiver 22 is an interrogation signal from the base station for requesting the current location of the device 1. The interrogation signal is communicated over the telecommunications network to the mobile phone 3, and in turn transmitted via a Bluetooth communications link by the mobile phone 3 to the device 1 for reception by the receiver 22. The microprocessor 18 is responsive to an interrogation signal from the base station for reading the signal indicative of the last determined position of the portable communications device 1 from the GPS positioning circuit 8, and the identity of the device 1 from the programmable memory 10, transmitting a signal to the mobile phone 3 indicative of the identity and location of the portable communications device 1 with a time label through the transmitter 21, for relaying by the mobile phone 3 to the base station.

The input interface in this embodiment of the invention also comprises a third interface circuit 23 and a microphone/loudspeaker 24 for facilitating entry of a voice input signal to the portable communications device 1. The microprocessor 18 is responsive to a voice input signal, for example, a scream or a shout from the person wearing the portable communications device 1, in the same way as it is responsive to inputting of an input signal through one or both of the activating switches 14.

By entering an appropriate input signal through the activating switches 14, bi-directional voice communication through the microphone/loudspeaker 24 and the third interface circuit 23 can be established via the transmitter/receiver 20 under the control of the microprocessor 18 for facilitating bidirectional voice communication through the mobile phone 3 with the base station or another location with which a telephone call has been established by the mobile phone 3. For example, by operating the activating switches 14 in an appropriate sequence, bi-directional voice communication through the portable communications device 1 and the mobile phone 3 with the base station or other location could be established. Additionally, bi-directional communication may be established with the portable communications device 1 by the base station or another location through the mobile phone 3.

Additionally, in this embodiment of the invention the input interface comprises a fourth interface circuit 25 and a corresponding I/O port 27 for facilitating acquisition of data from another electronic device such as a patient monitoring device (not shown) to the portable communications device 1. Such data may, for example, be digital or analogue data from the patient monitoring device, which, for example, may monitor the heart rate, blood pressure, blood sugar level and the like of the person wearing the portable communications device. Typically, the patient monitoring device (not shown) may be of the type which would output an alerting signal in the event of the parameter of the person being monitored exceeding an upper predetermined level or falling below a lower predetermined level, and the microprocessor 18 would be programmed to be responsive to such a signal for transmitting an activating signal to the mobile phone 3 similar to that transmitted in response to the input signal entered through one or both of the activating switches 14; However, in this case a message or messages would be read by the microprocessor 18 from the programmable memory 10 corresponding to the relevant parameter for transmission with the activating signal to the mobile phone. Where the portable communications device 1 is to be used in conjunction with a patient monitoring device, appropriate messages would be stored in the programmable memory 10.

The microprocessor 18 may also be programmed for periodically polling the patient monitoring device for reading data therefrom, and the microprocessor 18 would compare the read data with corresponding predetermined upper and lower levels for the parameters being monitored by the patient monitoring device. Such predetermined upper and lower levels would be stored in the programmable memory 10. In the event of a signal read from the patient monitoring device indicative of a particular parameter falling outside the predetermined upper and lower levels, the microprocessor 18 would read an appropriate message, the identity of the device 1 and the telephone number of the base station from the programmable memory 10, read a signal indicative of the last determined position of the device 1 from the GPS positioning circuit 8 and prepare an activating signal for transmission to the mobile phone 3. The microprocessor 18 would then transmit the activating signal to the mobile phone 3 containing the identity and location of the device 1, the message read from the programmable memory 10, the telephone number of the base station and a time label for communication to the base station.

It is also envisaged that if the patient monitoring device was provided with the capability of communicating under the Bluetooth standard, communications between the portable communications device 1 and the patient monitoring device could be through the transmitter/receiver 20 of the portable communications device 1.

A visual display means, namely, a visual display screen 28 is provided in the housing 5 for facilitating displaying data which may be data inputted by the individual through one or both of the activating switches 14 for communicating through the mobile phone 3 to the base station or other location. Additionally, the data displayed on the visual display screen 28 may be data from the patient monitoring device (not shown). The data displayed on the visual display screen 28 may also be a message from the base station to the person wearing the device.

In this embodiment of the invention, the microprocessor 18 is programmed to be responsive to a particular sequence of operation of the activating switches 14 for scrolling the messages stored in the programmable memory 10 on the visual display screen 28, so that a message could be selected by operating one or both of the activating switches 14 at an appropriate time while the message is displayed on the screen. The selected message would then be transmitted with an activating signal under the control of the microprocessor 18 to the mobile phone 3 for communication to the base station or other selected location. Additionally, by appropriately operating the activating switches 14, data in the form of text may be inputted through the first interface circuit 12 which would be displayed on the visual display screen 28 prior to being transmitted under the control of the microprocessor 18 through the transmitter/receiver 20 to the mobile phone 3 for communication over the telecommunications network to the base station or other selected location.

The battery 17 as well as providing power for the input signals inputted through the activating switches 14 also powers the portable communications device 1 and its circuitry and components. A battery test button operated switch 30 located in the housing 5 co-operates with the microprocessor 18 and the battery 17 for testing the current state of the battery 17. A cancel button operated switch 31 also provided in the housing 5 co-operates with the first interface circuit 12 and the microprocessor 18 for cancelling inadvertently entered input signals through the first and third interface circuits 12 and 23.

In use, the portable communications device 1 is operable under the control of the microprocessor 18. Initially, messages which are to be transmitted by the portable communications device 1, if they are not already stored in the programmable memory 10, are entered into the programmable memory 10 through a mobile phone. Bluetooth communication is set up between the mobile phone 3 and the portable communications device 1 through the transmitter/receiver 20, and the microprocessor 18 is operated in a mode for storing messages transferred from the mobile phone 3 through the transmitter/receiver 20 in the programmable memory 10. The identity of the device 1 or that of the person who will wear the device 1 is also entered through the mobile phone and stored in the programmable memory 10. The identity of the device 1 may be stored as an identity code, and if the identity of a person is being stored, the name, address and telephone number of the person may be stored. The telephone number of the base station, and any other locations to which messages from the portable communications device 1 are to be communicated are also entered through the mobile phone and stored in the programmable memory 10.

Once the messages, identity of the device 1 or the person who would be wearing the device 1, and the telephone number of the base station, and any other telephone numbers to which messages are to be communicated have been stored in the programmable memory 10, the portable communications device 1 is ready for use. A person wishing to use the portable communications device 1 wears the portable communications device 1 on their person, for example, by wearing it on a chain around their neck, and also carrying a mobile phone 3 which is switched on. Once powered up, the GPS positioning circuit 8 at the predetermined intervals reads and stores its position from a GPS satellite navigation system and/or a terrestrial positioning system. The microprocessor 18 reads the first, third and fourth interface circuits 12, 23 and 25 and on receipt of an input from any one of the three interface circuits, appropriate action is taken.

In the event of the person wearing the portable communications device 1 finding themselves in an emergency situation, the person depresses one or both of the panic buttons 15 of the activating switches 14. If the signal inputted through one or both of the activating switches 14 is a single pulse switch without giving an indication of the nature of the emergency, the microprocessor 18 reads one of the stored messages from the programmable memory 10 which merely indicates the presence of an emergency without identifying the type of emergency. The microprocessor 18 also reads the identity of the portable communications device 1 and the telephone number of the base station and the telephone number or numbers of any other locations to which the emergency message is to be transmitted from the programmable memory 10. The microprocessor 18 also reads the last determined position of the portable communications device 1 from the GPS positioning circuit 8.

The microprocessor 18 then prepares an activating signal which comprises the identity of the portable communications device 1, the message and the telephone number or telephone numbers to which the message is to be transmitted, which have been read from the programmable memory 10. The activating signal also contains the last determined position of the device read from the GPS positioning circuit 8. The microprocessor 18 then transmits the activating signal with a time label through the transmitter/receiver 20 to the mobile phone 3. On receipt of the activating signal, the mobile phone 3 dials the number or numbers to which the data contained in the activating signal is to be communicated over the telecommunications network, and transmits the data. The message indicating the existence of the emergency read from the programmable memory 10 may be a voice message or a text message. Similarly, the identity of the portable communications device 1 may be stored in voice or text form.

On the other hand, if by virtue of the sequence in which the activating switches 14 are operated by the panic buttons 15 to indicate the nature of the emergency, the microprocessor 18 reads the appropriate message from the programmable memory 10. Thereafter the microprocessor 18 operates in similar fashion as has just been described and transmits an activating signal through the transmitter/receiver 20 to the mobile phone 3, which contains the identity and location of the portable communications device 1, the message read from the programmable memory 10 and the telephone number or numbers to which the data is to be communicated by the mobile phone 3.

In the event that the signal received by the third interface circuit 23 is indicative of a scream or a shout having been detected, the microprocessor 18 prepares and transmits an activating signal to the mobile phone 3 which contains data similar to that already described, including the identity and location of the device, an appropriate message, which in this case, would be a message which would only indicate the existence of an emergency without identifying the nature of the emergency, and the telephone number or telephone numbers to which the data in the activating signal is to be transmitted, and the activating signal would be time labelled.

If a patient monitoring device is coupled to the portable communications device 1 through the I/O port 27, depending on the type of patient monitoring device, the microprocessor 18 will read signals from the patient monitoring device, and in the event of the patient monitoring device indicating that a parameter being monitored is outside the predetermined levels, the microprocessor 18 prepares an appropriate activating signal which is transmitted to the mobile phone 3 through the transmitter/receiver 20. If the portable communications device 1 is coupled to a patient monitoring device, in general, appropriate messages which would be required to be transmitted in the event of a monitored parameter falling outside the predetermined levels would be stored in the programmable memory 10. Thus, in the event of a signal from the patient monitoring device being received by the microprocessor 18, the microprocessor 18 assembles an activating message similar to those already described, which would include the identity and location of the device 1, a message read from the programmable memory 10 indicating the nature of the parameter which is outside the predetermined levels and the telephone number or numbers to which the message is to be relayed by the mobile phone 3. The activating signal would then be transmitted through the transmitter/receiver 20 to the mobile phone 3.

Alternatively, if the microprocessor 18 is programmed to compare signals read from the patient monitoring device with upper and lower predetermined levels, at predetermined intervals the microprocessor 18 would read signals from the patient monitoring device which would then be compared by the microprocessor 18 with the predetermined upper and lower levels stored in the programmable memory 10. If any read parameter fell outside the appropriate predetermined upper and lower levels, the microprocessor 18 would assemble an appropriate activating signal which would be transmitted through the transmitter/receiver 20 to the mobile phone 3. The activating signal would include the identity and location of the portable communications device 1, the message read from the programmable memory 10 and the phone number or phone numbers to which the data is to be relayed by the mobile phone 3. The activating signal would be time labelled.

If appropriate, in the event that signals received from the patient monitoring device do not represent a situation for which the immediate transmission of a message to the base station or to other locations is appropriate, the signals read from the patient monitoring device are stored by the microprocessor 18 in the programmable memory 10 for subsequent onward transmission, for example, when the portable communications device 1 is polled by the base station for the data from the patient monitoring device.

On being activated in response to an emergency signal inputted through the first, third or fourth interface circuits, the microprocessor 18 at predetermined intervals outputs activating signals to the mobile phone 3 through the transmitter/receiver 20, each of which contains the identity and last determined position of the device, the emergency message, the phone number of the base station or other phone numbers to which the data is to be communicated, and a time label, so that the movement of the device, and in turn the person wearing the device can be monitored by the base station.

Additionally, the base station at predetermined intervals polls the portable communications device 1 through the mobile phone 3 with an interrogation signal interrogating the portable communications device 1 as to its current position. On receipt of an interrogation signal, the microprocessor 18 reads the last determined position from the GPS positioning circuit 8 and also reads its identity from the programmable memory 10, and transmits its identity and location along with a time label through the transmitter/receiver 20 to the mobile phone 3 for relaying to the base station.

If desired, bi-directional communication may be established between the portable communications device 1 and the base station or other locations, and the bi-directional communication is established by the microprocessor 18 in response to the operation of the activating switches 14 by the panic buttons 15 in a predetermined sequence. Bi-directional communication may be via voice through the microphone/loudspeaker 24, or via text messaging. However, since the portable communications device 1 is not provided with a keypad, the text messages which would be transmitted by the portable communications device 1 would be those stored in the programmable memory 10, and an appropriate message would be selected by operating the microprocessor 18 through an appropriate sequence of operation of the activating switches 14 to scroll the messages stored in the programmable memory 10 on the visual display screen 28. The appropriate message would be selected by the activating switches 14 for transmission through the transmitter/receiver 20 to the mobile phone 3. Text messages received from the base station or elsewhere through the mobile phone 3 and the transmitter/receiver 20 would be displayed under the control of the microprocessor 18 on the visual display screen 28.

Referring now to FIGS. 5 to 8, there is illustrated a portable communications device according to another embodiment of the invention, indicated generally by the reference numeral 40, for use in conjunction with a Bluetooth enabled mobile phone, similar to the mobile phone 3 for communicating a signal indicative of the existence of an emergency to a base station. The portable communications device 40 is also adapted for receiving polling interrogation signals from the base station and responding thereto. The portable communications device 40 is substantially similar to the portable communications device 1 and similar components are identified by the same reference numerals.

However, in this embodiment of the invention the portable communications device 40 is not provided with third and fourth interface circuits. The position determining circuit is a positioning circuit 8, which establishes the position of the device 1 by interrogating the GPS or other in-built positioning circuitry of the mobile phone 3. In the event of the mobile phone 3 not having suitable in-built circuitry for determining its current location, the positioning circuit 8 establishes the position of the device 40 by interrogating the telecommunications network with which the mobile phone 3 is in communication, through the mobile phone 3.

The programmable memory 10 in this embodiment of the invention stores the identity of the device, and two messages. One of the messages is indicative of the existence of an emergency, and typically, would include appropriate words, for example, "help", "an emergency exists" or the like, and a test message for testing that the device 40 is operational.

Additionally, the programmable memory 10 stores a plurality of telephone numbers of the destination of locations to which the emergency message is to be transmitted. Typically, not more than three telephone numbers will be stored in the programmable memory. The first telephone number will be that of either the national emergency service or a base station, and in some cases both the national emergency service and the base station telephone numbers may be stored. However, where both are stored, the national emergency service will always be stored first and will always be the first telephone number to be retrieved, and the base station telephone number will be the next telephone number to be retrieved. The next telephone number will be the next most important number, for example, the home of the individual or the telephone number of the most important contact person for the person wearing the device 40, and perhaps one further telephone number may be stored, for example, that of a friend. However, for ease of description, it will be assumed that the telephone numbers stored in the programmable memory 10 are those of the base station, the home of the person wearing the device and a friend, and the telephone numbers are stored in that order and will be retrieved in that order by the microprocessor 18.

The first interface circuit 12 comprises two activating switches 14, which are similar to the activating switches 14 of the device 1, and which are operable by the corresponding pair of panic buttons 15. However, in this embodiment of the invention the operation of the activating switches 14 for inputting an input signal for alerting to the existence of an emergency is different to that of the activating switches 14 of the device 1. To guard against false alarms, in this embodiment of the invention the first interface circuit 12 is only responsive to the two activating switches 14 being in the closed circuit state simultaneously for providing the input signal to the microprocessor 18 indicative of an emergency. Additionally, the interface circuit is responsive to the duration for which the two activating switches 14 are held in the closed circuit state for providing the input signal. For so long as the two activating switches 14 are held in the closed circuit state, the first interface circuit 12 provides the input signal to the microprocessor 18.

The microprocessor 18 is responsive to the duration of the input signal. If the input signal is a long duration signal, typically, of duration greater than six seconds, the microprocessor 18 interprets this signal as indicating an emergency of top priority status. If the input signal provided by the first interface circuit 12 is a short duration signal, typically of duration of three seconds or less, the microprocessor 18 interprets this signal as being of an emergency of lesser status than the top priority status emergency indicated by the long duration input signal. On the operation of the activating switches resulting in a short duration input signal, indicating a lesser status emergency, the microprocessor 18 is responsive to the shorter duration input signal for preparing the activating signal to include the identity and location of the device and the emergency message, and for transmitting the activating signal to the mobile phone, for communicating the data in the activating signal to all the telephone numbers in the programmable memory 10, with the exception of the first stored number, namely, the telephone number of the base station.

However, in this embodiment of the invention, as will be described with reference to FIG. 8, instead of sending one activating signal to the mobile phone containing all the telephone numbers, the microprocessor 18 includes one telephone number in each activating signal, and retransmits the activating signal with the telephone number in each retransmission changed to the next telephone number until the data in the activating signal has been communicated to all the telephone numbers to which the data should be communicated. This is described in more detail below with reference to FIG. 8.

Alternatively, if the input signal read by the microprocessor 18 is a long duration signal, the microprocessor 18 includes the first stored telephone number in the programmable memory 10, namely, the number of the base station as well as all the other numbers in the list of telephone numbers to which the identity and location of the device and the emergency message are to be communicated. The telephone number of the base station heads the list of telephone numbers, so that the data in the activating signal is first communicated to the base station and then subsequently to the remaining telephone numbers in the order in which they are stored in the programmable memory 10.

However, in this embodiment of the invention prior to preparing the activating signals which include the identity and location of the device and the emergency message and the respective telephone numbers, the microprocessor 18 initially prepares preliminary activating signals which include the identity of the device and the emergency message as well as the respective telephone numbers to which the emergency message is to be communicated by the mobile phone, and the preliminary activating signals are transmitted to the mobile phone 3 through the transmitter 21 of the transmitter/receiver 20. While the data embedded in the preliminary activating signals is being communicated by the mobile phone 3 to the respective numbers to which it is to be communicated, the microprocessor 18 reads the last determined location of the device from the positioning circuit 8, and if the last stored position is not a recently stored position, the microprocessor activates the positioning circuit 8 in order to determine the current location of the device 40. On the current or the last determined location of the device 40 being read from the positioning circuit 8, the microprocessor 18 then commences to prepare the activating signals which include the identity and location of the device and the emergency message, as well as the respective telephone numbers to which the data in the activating signal is to be communicated by the mobile phone 3. Activating signals are sequentially prepared by the microprocessor 18 each with the next telephone number to which the message is to be communicated by the mobile phone 3.

The advantage of programming the microprocessor 18 to prepare preliminary activating signals which include the identity of the device and the emergency message and transmitting these preliminary activating signals to the mobile phone 3 prior to preparing the activating signals which comprise the identity and location of the device as well as the emergency message is that an indication can be quickly given to the base station if appropriate, and the other mobile phone numbers that an emergency exists, so that those receiving the message can prepare to take appropriate action as soon as the location of the device has been confirmed by the data in the activating signals. Thus, delays which may occur in determining the precise location of the device 40 from the positioning circuit 8 will not, in general, delay implementation of the necessary action to deal with the emergency, since, in general, the approximate location of the person wearing the device 40 should be known.

Each preliminary activating signal and each activating signal transmitted by the device 40 is time labelled by the microprocessor 18.

Additionally, in order to facilitate the emergency services homing in on the device 40, and in turn the person, at predetermined intervals once the activating signals have been transmitted by the device 40, the microprocessor 18 operates the transmitter 21 of the transmitter/receiver 20 to operate at a higher power level to transmit a homing signal for predetermined periods at predetermined intervals for facilitating homing in on the device 40. The homing signal is transmitted for a duration between the time the last of the activating signals has been transmitted and the time the device is about to transmit the next set of activating signals. In other words, the homing signals are transmitted during time periods B, which are described below with reference to block 88 of FIG. 8. The transmitter 21 is operated at a sufficient power level to provide reception of the homing signal within a radius of approximately 100 meters. The homing signal is transmitted as a Bluetooth signal and includes the identity of the device, so that the rescue services with appropriate equipment can receive the signal, and thus can home in on the homing signal which includes the identity of the device, and thus can home in on the device 40.

Instead of a visual display screen, a light emitting diode 43 is provided in the housing 5 of the device 40 for indicating the success or otherwise of the mobile phone 3 in sending the data embedded in the preliminary activating signals and the activating signals.

Referring now to FIGS. 8(*a*) and 8(*b*) a flow chart of a sub-routine of a computer programme which controls the microprocessor 18 in response to the two activating switches 14 being operated in the closed position simultaneously as a result of an emergency existing will now be described. Block 60 starts the sub-routine, and the sub-routine moves to block 61, which checks if the two activating switches 14 are simultaneously in the closed state, and the time duration for which the two activating switches 14 are in the closed state. If it is determined that the input signal is a long duration signal resulting from the two activating switches 14 being in the closed state for the long duration period, which indicates a top priority emergency, the sub-routine moves to block 62. Block 62 reads the identity of the device and the emergency message as well as the telephone number of the base station stored in the programmable memory 10 and prepares a preliminary activating signal which includes the identity of the device 40, the emergency message and the telephone number of the base station. The sub-routine then moves to block 63, which transmits the prepared preliminary activating signal through the transmitter 21 of the transmitter/receiver 20 to the mobile phone 3. Block 63 also checks with the mobile phone 3 if the data in the preliminary activating signal has been sent to the base station, and if so, block 63 causes the microprocessor 18 to power the light emitting diode 43 to indicate that the data has been sent to the base station, and the sub-routine moves to block 64, which will be described below. On the other hand, should block 63 determine from the mobile phone 3 that the data was not successfully transmitted by the mobile phone 3, the sub-routine moves to block 65, which determines an error message, and causes the microprocessor 18 to pulse the light emitting diode 43 to indicate failure of the transmission of the data by the mobile phone 3. The sub-routine then moves to block 64.

On the other hand, if block 61 determines that the input signal is a short duration signal resulting from the activating switches 14 being simultaneously in the closed state for the short duration time period only, which indicates a lesser status emergency, the sub-routine moves to block 68. Block 68 reads the identity of the device and the emergency message from the programmable memory 10 and prepares part of the preliminary activating signal to be transmitted. However, block 68 does not read the telephone number of the base station from the programmable memory 10. After the activating signal has been partly prepared by block 68 to include the identity of the device and the emergency message, the sub-routine moves to block 64. Block 64 checks if a predetermined time period, typically, ten seconds has elapsed since the activating switches 14 were first activated, and also checks if the cancel button operated switch 31 has been activated. If so, the sub-routine deems that the alarm was a false alarm, and returns to block 60. On the other hand, if block 64 determines that the cancel button operated switch 31 has not been activated, the sub-routine moves to block 70.

Block 70 reads the next telephone number from the programmable memory 10, which if this is the first pass of the sub-routine is the telephone number immediately after that of the base station, and would be that of the home of the person. The telephone number read from the programmable memory 10 by block 70 is incorporated in the preliminary activating signal by block 70, and block 70 also operates the transmitter 21 of the transmitter/receiver 20 for transmitting the preliminary activating signal to the mobile phone 3.

Block 71 checks with the mobile phone 3 to ascertain if the data in the preliminary activating signal has been sent to the number in the preliminary activating signal, and if so, the microprocessor 18 is operated to power the light emitting diode 43 for a predetermined period of time, to indicate that the data was sent. The sub-routine is then moved to block 72, which will be described below. On the other hand, should block 71 determine from the mobile phone 3 that the data was not sent by the mobile phone 3, the sub-routine moves to block 74, which determines an error message, and causes the microprocessor 18 to pulse the light emitting diode 43 to indicate failure of the transmission of the data by the mobile phone 3. The sub-routine then moves to block 72.

Block 72 checks if either the preliminary activating signals or the activating signals, as the case may be, which are being transmitted, have been transmitted by the device 40, and if so, the sub-routine moves to block 75. In other words, block 72 checks if either the preliminary activating signal or the activating signal, as the case may be, has been sent to the last telephone number stored in the programmable memory 10. If block 72 determines that the preliminary activating signal or the activating signal, as the case may be, has not been sent to the last of the telephone numbers stored in the programmable memory 10, the sub-routine is returned to block 64.

Block 75 checks if this is the first pass of the sub-routine, and if so, the sub-routine moves to block 76. Block 76 operates the microprocessor 18 to read the co-ordinates of the last determined position of the device 40 from the positioning circuit 8, and moves to block 77. Block 77 checks if the co-ordinates read from the positioning circuit 8 are up to date co-ordinates, and if so, the sub-routine moves to block 78, which prepares the activating signal, which contains the identity of the device 40, the co-ordinates of the location of the device 40 and the emergency message. The sub-routine is then moved to block 83. Block 83 again checks if the original input signal was a long duration input signal or a short duration input signal, and if the input signal was a long duration signal, the sub-routine is returned to block 63. Otherwise, the sub-routine is returned to block 64. Block 63 transmits the prepared activating signal to the base station, and proceeds as already described. Block 64 also proceeds as already described, and the sub-routine then moves to block 70, which incorporates the next telephone number stored in the programmable memory 10 into the prepared activating signal, and proceeds as already described.

On the other hand, if block 77 determines that the co-ordinates obtained by block 76 are not the up to date co-ordinates, the sub-routine moves to block 79, which interrogates the mobile phone 3 in order to obtain the up to date co-ordinates of the position of the mobile phone 3 from the position determining circuitry of the mobile phone 3, if the mobile phone 3 is provided with such position determining circuitry. The sub-routine then moves to block 80, which checks if block 79 has obtained the up to date co-ordinates of the location of the mobile phone 3. If so, the sub-routine moves to block 78, which has already been described. On the other hand, if block 80 determines that block 79 has not obtained the up to date co-ordinates from the mobile phone 3, the sub-routine moves to block 81 which operates the positioning circuit 8 to interrogate the terrestrial system of the communications network through the mobile phone 3 to obtain the up to date co-ordinates of the location of the mobile phone 3, and in turn the location of the device 40. The sub-routine then moves to block 82. Block 82 checks if block 81 has obtained the up to date co-ordinates of the location of the mobile phone 3, and if so, the sub-routine moves to block 78, which has already been described. Otherwise, the sub-routine moves to block 83, which has already been described.

On the other hand, should block 75 determine that this is not the first pass of the sub-routine resulting from this present emergency, the sub-routine moves to block 85. Block 85 checks if the cancel button operated switch 31 has been activated to indicate a false alarm, and if so, the sub-routine returns to block 60. Otherwise, the sub-routine is moved to block 86.

Block 86 operates the microprocessor 18 to output the homing signal which includes the identity of the device 40 through the transmitter 21 of the transmitter/receiver 20, and to operate the transmitter 20 in a high power mode in order that the range of the homing signal is maximised, and preferably, can be picked up from the device 40 within a range of approximately 100 meters. This facilitates the rescue services, who would have appropriate receiving equipment to receive the homing signal which identifies the device 40 and to home in on the device 40. After the homing signal has been transmitted for the predetermined time period, the sub-routine moves to block 87.

Block 87 checks if a time period A has elapsed. The time period A would be a total time period from the time the activating switches 14 have been operated into the closed state for the first time, during which the device 40 would operate in this sub-routine in the event of an emergency, and typically, would be approximately three hours. It is anticipated that any emergency arising would be dealt with within a three-hour time period from the time the activating switches 14 are first operated into the closed state. If block 87 determines that the time period A has elapsed, the sub-routine is returned to block 60. On the other hand, if block 87 determines that the time period A has not elapsed, the sub-routine moves to block 88, which checks if a time period B has elapsed since the last activating signal was transmitted. The time period B may be any time period, but typically, would be in the order of half an hour, although it may be considerably less. If block 88 determines that the time period B has elapsed, the sub-routine is returned to block 76, which reads the co-ordinates of the location of the device from the positioning circuit 8 and proceeds as appropriate through blocks 77 to 78 and in turn to block 83, and so on for transmitting again the identity of the device, the co-ordinates of the location of the device and the emergency message to each of the phone numbers to which this data should be transmitted, in order to update the individuals who are to receive the message of the current position of the device, in order to help track the movement of the device 40. On the other hand, if block 88 determines that the time period B has not elapsed since the last transmission of the activating signals to the telephone numbers, the sub-routine returns to block 85, which has already been described.

Additionally, the device 40 is also responsive to being polled by the base station, and on being polled by the base station, the microprocessor 18 reads the last determined position of the device 40 from the positioning circuit 8 and reads the identity of the device 40 from the programmable memory 10, and transmits the identity and location of the portable communications device 40 with a time label to the mobile phone 3, which in turn communicates the data to the base station via the telecommunications network.

While the portable communications device of FIGS. 1 to 4 has been described as comprising a position determining circuit which is a GPS positioning circuit which also has a facility for utilising a terrestrial positioning system for determining the position of the device, any other suitable position determining circuit may be provided. Indeed, in certain cases, it is envisaged that a position determining circuit which would rely solely on one or more terrestrial positioning systems may be used. It will also be appreciated that the position determining circuit may rely on other satellite positioning systems besides a GPS satellite navigation system, or may rely solely on a satellite positioning system for determining the position of the device.

Additionally, it will be appreciated that while the portable communications devices have been described as being communicable with a Bluetooth enabled mobile phone, the portable communications devices may be communicable with any other type of wireless enabled mobile phones, or indeed, any other wireless enabled telecommunications terminal equipment device besides a mobile phone, and such other wireless enabled telecommunications terminal equipment devices may be Bluetooth enabled or otherwise wireless enabled.

It will also be appreciated that while the portable communications devices have been described as being communicable with a Bluetooth enabled mobile phone carried on the person, it is envisaged in certain cases that the portable communications devices according to the invention may be communicable with a mobile phone or mobile phones, other than that carried on a person. For example, in the event of an emergency, it is envisaged that the portable communications devices may output an activating signal using the Bluetooth or other wireless standard which would be receivable by any Bluetooth or other appropriately wireless enabled mobile phone or other Bluetooth or appropriately wireless enabled telecommunications terminal equipment device in the near vicinity, and which would activate each and every Bluetooth or otherwise appropriately wireless enabled telecommunications terminal equipment device which received the activating signal to transmit the data in the activating signal via a telecommunications network to the base station, the number of which would be contained in the activating signal.

Additionally, while the identity of the locations to which the messages are to be communicated have been described as being stored in the programmable memory of the device as telephone numbers, the identity of the locations could be stored in any other suitable form, for example, as e-mail addresses, URL or IP addresses. Further, it will be appreciated that the identity of the device and the messages may be stored in any suitable form, and may be stored for reproduction as voice data or text data, or in any other suitable form.

It is also envisaged that the portable communications devices according to the invention may be provided with an audible alarm, which would be activated under the control of the microprocessor in response to an input signal received through the first, third, or indeed fourth interface circuits.

It is also envisaged that the first interface circuit may comprise a sensor which would be responsive to any significant environmental change, for example, but not limited to, a significant temperature change, a significant humidity change, a pH change, immersion in a liquid, for example, for marine applications, the device would be activated on coming in contact with water, to detect an event of "man overboard", and in which case, on the sensor detecting any such significant changes or immersion in liquid, the interface circuit would output a signal to the microprocessor 18, which would assemble an appropriate activating signal for transmission through the transmitter/receiver 20 to the mobile phone as already described.

It is also envisaged that the transmitter/receiver 20 may be adapted for transmitting at predetermined times a Bluetooth signal for positioning determining to a range in excess of 100 meters.

While the portable communications devices have been described as communicating according to the Bluetooth standard, the portable communications devices may communicate using any other wireless communications standards, which may include any of the following standards:

- IEEE802.11 Standard
- 121.5 MHz Search & Rescue Transponder Standard (e.g., GMDSS)
- 406 MHz Search & Rescue Transponder Standard (e.g., GMDSS)
- GSM, UMTS, CDMA, 3G or other mobile radio standard
- Optical, Ultrasonic or other non-radio standards or any other evolution, update or improvement to any of the above standards, or indeed, any other wireless communications standard.

The invention claimed is:

1. A portable communications device for wearing on a person for communicating a signal indicative of the location of the person to a predetermined location, wherein the communications device is operable in conjunction with a wireless enabled telecommunications terminal equipment device for communicating the signal indicative of the location of the person to the predetermined location, and the portable communications device comprises a position determining circuit for communicating with an external electronic positioning system for determining the location of the device, an input interface for receiving an input signal, a wireless transmitter for transmitting a signal from the device to the wireless enabled telecommunications terminal equipment device via a wireless communications link, a microprocessor responsive to an input signal entered through the input interface for reading a signal indicative of the location of the device from the position determining circuit, and for operating the wireless transmitter for transmitting an activating signal to the wireless enabled telecommunications terminal equipment device, the activating signal comprising a signal indicative of the identity of the device and the signal indicative of the location of the device, the activating signal being provided for activating the wireless enabled telecommunications terminal equipment device for communicating the signals indicative of the identity and location of the device to the predetermined location via a telecommunications network.

2. A portable communications device as claimed in claim 1 wherein the input interface comprises an activating switch for facilitating inputting of an input signal, and the microprocessor is responsive to the input signal.

3. A portable communications device as claimed in claim 2 wherein the activating switch is a bi-state activating switch, and is operable from one of the states to the other for facilitating the inputting of the input signal, and preferably, the bi-state activating switch is stable in one state, and the input signal is inputted through the activating switch by operating the switch from the stable state to the other state, and advantageously, the activating switch is a button operated activating switch.

4. A portable communications device as claimed in claim 1 wherein the input interface comprises a voice signal interface circuit for receiving a voice input signal, the microprocessor being responsive to the voice input signal, and preferably, the voice signal interface circuit comprises a microphone, and advantageously, the voice signal interface circuit comprises a loudspeaker for facilitating bi-directional voice communication with the portable communications device.

5. A portable communications device as claimed in claim 1 wherein a storing means is provided for storing the identity of the device, and the microprocessor is responsive to the input signal for reading the identity of the device from the storing means, and preferably, the storing means is adapted for storing at least one message for transmission in the activating signal through the wireless transmitter under the control of the microprocessor, and advantageously, the storing means is adapted for storing a plurality of selectable messages, and the microprocessor is responsive to the input signal for selecting at least one of the stored messages for transmission in the activating signal through the wireless transmitter under the control of the microprocessor, and preferably, one of the selectable messages stored in the storing means is an alerting message indicative of an emergency status event.

6. A portable communications device as claimed in claim 5 wherein one of the messages stored in the storing means is a message indicative of the nature of the emergency.

7. A portable communications device as claimed in claim 5 wherein the storing means is programmable for permitting storing of the messages, and preferably, an input means is provided for inputting data and messages to the storing means, and advantageously, the storing means is adapted for storing data indicative of the destination of the predetermined location, and preferably, the storing means is adapted for storing data indicative of a plurality of predetermined locations.

8. A portable communications device as claimed in claim 7 wherein the data indicative of at least one of the predetermined locations which is stored in the storing means is a telephone number of the locationdestination of the signal.

9. A portable communications device as claimed in claim 7 wherein the data indicative of at least one of the predetermined locations which is stored in the storing means is a Uniform Resource Locator of the location, and preferably, the data indicative of at least one of the predetermined locations which is stored in the storing means is an IP address of the location, and advantageously, the wireless transmitter is adapted for facilitating voice communication between the portable communications device and the wireless enabled telecommunications terminal equipment device, and preferably, the input interface comprises a wireless receiver for receiving a signal from the wireless enabled telecommunications terminal equipment device via a wireless communication link for facilitating reception of an input signal received via the telecommunications network by the wireless enabled telecommunications terminal equipment device, and advantageously, the wireless transmitter and receiver co-operate for facilitating bi-directional communication between the portable communications device and the wireless enabled telecommunications terminal equipment device, and preferably, the wireless receiver is adapted for facilitating voice communication between the wireless enabled telecommunications terminal equipment device and the portable communications device.

10. A portable communications device as claimed in claim 9 wherein data and messages to be stored in the storing means are inputted through the wireless receiver, and the microprocessor is responsive to signals received through the wireless receiver for storing data and messages.

11. A portable communications device as claimed in claim 9 wherein the microprocessor is responsive to an interrogation signal received through the wireless receiver for transmitting the signals indicative of the identity and location of the device through the wireless transmitter, and preferably, the wireless receiver is a radio frequency receiver, and advantageously, the wireless transmitter is adapted to communicate with the wireless enabled telecommunications terminal equipment device using Bluetooth standard.

12. A portable communications device as claimed in claim 1 wherein the input interface comprises a data interface for acquiring data signals from a patient monitoring device worn by the person, and the microprocessor is responsive to data signals acquired through the data interface, and preferably, the microprocessor time labels at least some of the transmissions through the wireless transmitter with the current time of the transmission, and advantageously, the microprocessor time labels each of the transmissions through the wireless transmitter with the current time of the transmission, and preferably, a visual display means is provided on the portable communications device for displaying data, and advantageously, at least some of the messages to be transmitted are displayed on the visual display means, and preferably, each message to be transmitted is displayed on the visual display means, and advantageously, the microprocessor is responsive to a message received through the wireless receiver for displaying the message on the visual display means, and preferably, the microprocessor is responsive to an input signal received through the input interface for displaying data inputted through the input interface, and advantageously, the visual display means comprises a visual display screen.

13. A portable communications device as claimed in claim 1 wherein the microprocessor controls the telecommunications terminal equipment device for displaying data on a visual display means of the telecommunications terminal equipment device, and preferably, the wireless transmitter is a radio frequency transmitter, and advantageously, the wireless receiver is adapted to communicate with the wireless enabled telecommunications terminal equipment device using Bluetooth standard, and preferably, the position determining circuit for communicating with an external electronic positioning system is adapted for communicating with a satellite positioning system for determining the position of the device, and preferably, the position determining circuit for communicating with an external electronic positioning system is adapted for communicating with a terrestrial positioning system for determining the position of the device.

14. A portable communications device as claimed in claim 1 wherein the position determining circuit is adapted for determining the position of the portable communications device from a satellite system with or without supplemental transmissions from a terrestrial positioning system.

15. A portable communications device as claimed in claim 1 wherein the microprocessor is initially responsive to the input signal for operating the wireless transmitter for transmitting a preliminary activating signal to the wireless enabled telecommunications terminal equipment device, the preliminary activating signal comprising a signal indicative of the identity of the device, the activating signal being provided for activating the wireless enabled telecommunications terminal equipment device for communicating the signal indicative of the identity of the device to the predetermined location via the telecommunications network, and preferably, the preliminary activating signal comprises the emergency message.

16. A portable communications device as claimed in claim 1 wherein the microprocessor is responsive to the input signal for operating the wireless transmitter for outputting a homing signal containing the identity of the device for facilitating location of the device.

17. A portable communications device as claimed in claim 16 wherein the strength of the homing signal transmitted by the wireless transmitter is stronger than the strength of the activating signal transmitted by the wireless transmitter, and preferably, the homing signal is transmitted under the Bluetooth standard, and preferably, the homing signal is transmitted for a predetermined time period, and advantageously, the homing signal is transmitted at predetermined intervals.

18. A portable communications device as claimed in claim 1 wherein the input interface is adapted for receiving signals from a digital, still or moving camera, optical scanner, fingerprint reader, barcode reader, smart card reader or an environment sensor, and the microprocessor is responsive to input signals received from such devices for transmitting an appropriate message through the wireless transmitter to the wireless enabled telecommunications terminal equipment device, and preferably, an audible alarm is provided, and the microprocessor is responsive to an input signal received through the input interface for activating the audible alarm in the event of an input signal indicating the existence of an emergency, and advantageously, the range of the wireless transmitter of the portable communications device lies in the range of 0 meters to 100 meters, and preferably, the range of the wireless transmitter of the portable communications device is approximately 10 meters.

19. A portable communications device as claimed in claim 1 wherein the wireless enabled telecommunications terminal equipment device with which the portable communications device is adapted to communicate is a mobile phone carried on the person, and preferably, the portable communications device is housed within a housing, and preferably, the housing is a pendant type housing, and the portable communications device is adapted for wearing as a pendant around the neck of a person, wrist, ankle or other convenient location on or in proximity to the person.

20. In combination a portable communications device as claimed in claim 1 and a wireless enabled telecommunications terminal equipment device, the wireless enabled telecommunications terminal equipment device being adapted for communicating with the portable communications device, and being responsive to an activating signal from the portable communications device for communicating a signal received from the portable communications device to a predetermined location via a telecommunications network, and preferably, the wireless enabled telecommunications terminal equipment device is a mobile phone.

* * * * *